United States Patent Office 3,551,926
Patented Jan. 5, 1971

3,551,926
APPARATUS FOR THE COLD-STAMPING OF SCREWS, RIVETS AND THE LIKE
Amadeo Ferre, Juan Corrales 88, Esplugas de Llobregat, Barcelona, Spain
Filed Sept. 7, 1967, Ser. No. 666,073
Claims priority, application Spain, Sept. 8, 1966, 331,384, 331,386
Int. Cl. B21k 1/44; B23g 9/00
U.S. Cl. 10—13                                10 Claims

ABSTRACT OF THE DISCLOSURE

A stamping apparatus in which a rod is fed through a reciprocally movable percussion head into a die-clamp in a rotary body after which the rod is cut by a cutting device to leave a workpiece in the die-clamp which is successively acted on by the head to form the desired product which is then discharged from the rotary body and replaced with a subsequent workpiece.

BRIEF SUMMARY OF THE INVENTION

This invention relates to improvements in machines adapted for the cold-stamping of small dimensioned products such as screws, rivets and the like and for providing outstanding advantages over the machines presently known.

One of the known procedures for the manufacture of small dimensioned products comprises feeding a suitably straightened rod to a press of special design provided with a feeding and a cutting device, by means of which the press is progressively fed with the rod which is successively cut into pieces of the required lengths and grasped as they are cut by a confronting die-clamp. A number of die-clamps are mounted in a rotary body and the pieces are moved with the die-clamps by rotation of the body until the pieces are brought into alignment with a head-forming-die in a percussion headstock. The percussion headstock is then successively reciprocated to form heads on the extremities of the aligned cut-off portions of the bar in succession.

Such a known apparatus has a number of disadvantages and these involve a low production rate and an excessive complexity in the construction of the apparatus.

An object of the invention is to provide improved stamping apparatus in which a synchronized series of steps are carried out greatly increasing the rate of productivity while also simplifying the construction of the apparatus.

In accordance with the invention, the headstock is reciprocated in synchronization with the stepwise rotation of a rotary body containing die-clamps carrying workpieces such that the workpieces undergo successive operation steps, the workpieces being formed by feeding a rod in successive incremental lengths to the rotary body and successively cutting the rod after the free end thereof is engaged in successive die-clamps. Each cutting of the rod is synchronized to occur within a short period between the end of the percussion stroke of the headstock and the initiation of its return stroke so that the subsequent step of movement of the rotary body carries the new workpiece away to the first operation station and the next die-clamp is brought into position to receive the rod and have the next workpiece formed therein.

The apparatus contemplated according to the invention comprises a means for feeding an elongated rod from which the workpieces are to be cut, through the headstock to the die-clamps as the latter successively occupy a position in alignment with the rod, and a cutting means for severing a portion of the rod held in successive die-clamps to leave a workpiece in each die-clamp.

According to a feature of the invention the cutting means is supported for relative movement with respect to the rotary member in a direction axially of the feed of the rod to enable adjustment of the length of the workpieces severed from the rod.

In one embodiment the rod is guided through an opening in the cutting means and fed into an aligned die-clamp for each positive percussion stroke of the headstock, after which the workpiece is severed from the rod by a pivotal blade of the cutting means before the headstock reaches the end of its return stroke. The cutting means is completed by a fixed blade which cooperates with the movable blade to effect a cutting function, the fixed blade and arm being coupled for conjoint movement along a shaft on which the arm is pivotably mounted to adjust the length of the workpiece severed from the rod.

In another embodiment the cutting blade is slidable in a guide bush through which the rod passes, said blade being driven by a cam system to effect cutting of the rod in synchronization with the movement of the headstock and the rotary member carrying the die-clamps.

After the workpieces have been acted on by the headstock to form the desired products they are successively removed from the die-clamps by an extractor device.

DETAILED DESCRIPTION

Figure 1:
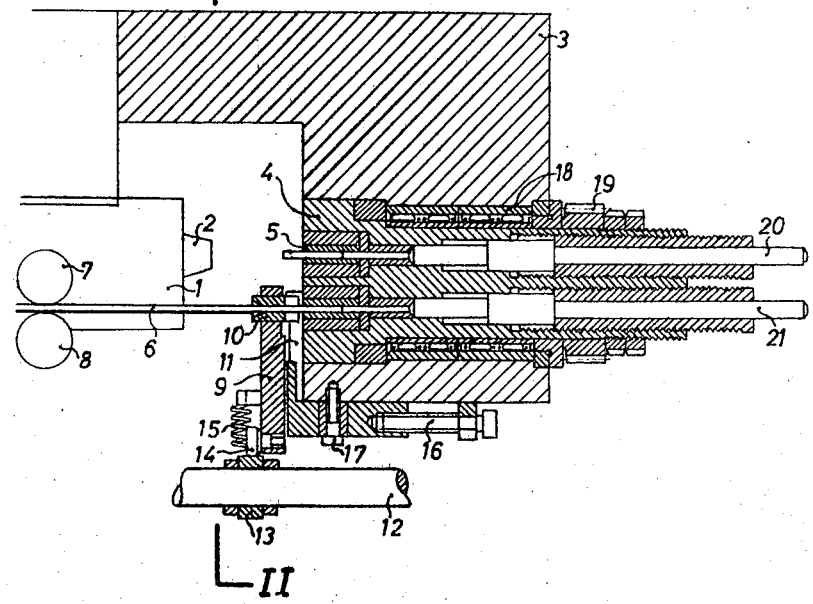
FIG. 1 is a longitudinal sectional view of apparatus according to the invention.

In the drawing there is shown a machine for cold-stamping screws comprising a headstock 1 which is reciprocally movable and carries various forming-dies 2 for the swaging or stamping of the heads of screws. The headstock 1 is a percussion head and it moves towards and away from a body 3 of the machine which supports an intermittently rotary member 4. A plurality of die-clamps 5 are arranged on the member 4 in a number that is necessary to complete all the working operations for forming the desired shape of the head on the screw. A workpiece carried by each of said die-clamps 5, and formed from a rod 6 in a manner to be explained more fully hereinafter, is brought by the rotary member into line with the different forming-dies 2, whereby the head of the screw or the like is swaged in successive operations.

The rod 6 from which each of the workpieces is obtained, is fed at the headstock 1 side of the machine by means of a suitable drive system such as feed-rollers 7 and 8, and passes into a confronting one of the die-clamps 5.

In the embodiment of FIG. 1 a cutting device for severing the rod to leave the workpieces in the die-clamps comprises a knife or blade member 9 that is movable axially and is provided with a rod guide bush 10 working conjointly with a separator 11 associated with the knife or guiding device, the rod being severed by axial displacement of the blade member 9 which is driven by an actuating rod 12, a cam 13, and a roller 14 associated with said knife member 9 while a spring 15 acts to return the blade member 9 to its inoperative position. By means of this arrangement, the displacement of the headstock and the blade member 9 are synchronized, so that when the headstock travels to the end of a percussion stroke and before its retraction or return stroke, a portion of the rod is severed to leave a workpiece in the clamp. The workpieces subsequently receive head-forming percussions from the headstock 1 and dies 2, while remaining in the die-clamp. The synchronization of the movement of the blade member 9 and the headstock is adjustable in time, for example, by adjusting the angular position of cam 13 on rod 12. Thus, the cutting operation may be adjusted to take place earlier in the percussion stroke or later, in the return stroke, but in any event to correspond with the synchronized movements of the rotary member 4 and headstock 1 so that the rod is severed and the resulting workpiece is transported in synchronism with the member 4 and headstock 1.

Figure 2:
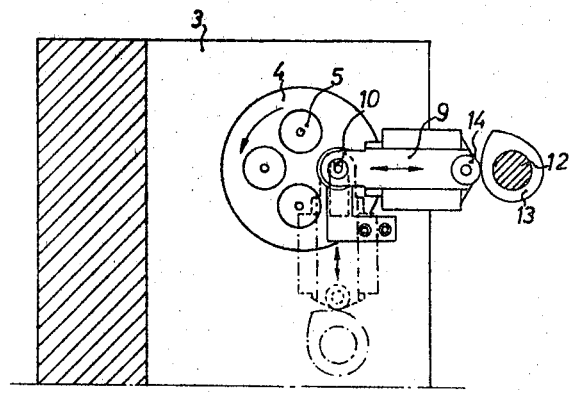
FIG. 2 is a sectional view taken along lines II—II of FIG. 1.

The cutting device may occupy the position shown in solid lines in FIG. 2 or alternatively it may be positioned as shown in chain lines.

The lengths of the workpieces or severed end portions of the rod for the different pieces to be made, are adjusted by means of a screw 16 acting on the blade assembly, and the length is fixed by means of a locking screw 17.

The rotary member 4 turns on needle bearings 18 and is driven by a gearing 19.

Each of the die-clamps 5 is coaxially mounted with respect to an orifice that extends throughout the entire length of the member 4, and ejector bars 20, 21 are slidable in the orifices to expel the pieces when finished.

The number of successive swaging operations to form the head of the screw and therefore the number of die-clamps employed will vary with the class of work to be performed, but generally it is from two to six, said die-clamps being symmetrically arranged within the rotary member 4.

Figure 3:
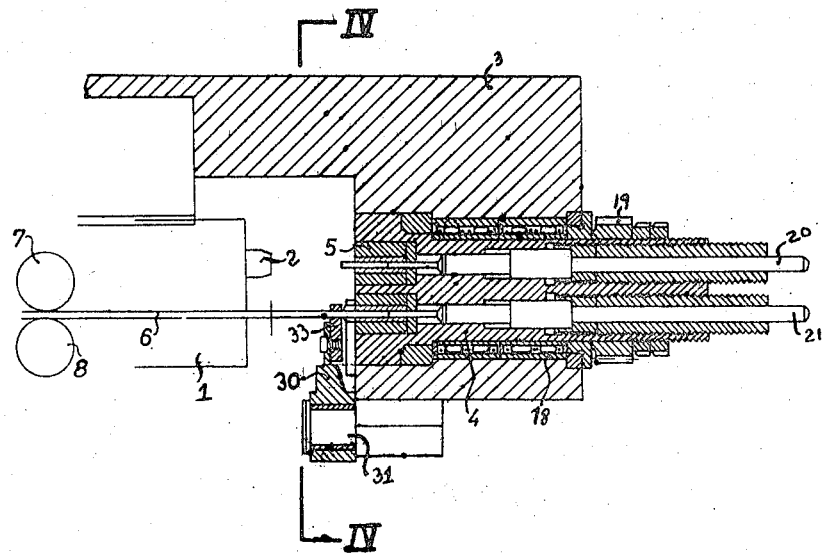
FIG. 3 is a longitudinal sectional view of another embodiment of the apparatus according to the invention.
Figure 4:
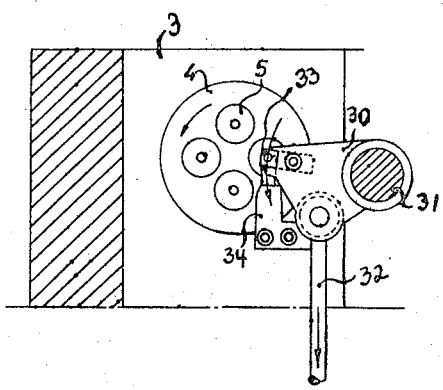
FIG. 4 is a sectional view taken along lines IV—IV of FIG. 3.

In the embodiment shown in FIGS. 3 and 4 the same reference numerals are employed for the structure which is the same as in the previously described embodiment. In FIGS. 3 and 4 the cutting device for the rod comprises an arm 30 turnable on a pivot shaft 31 and actuated by a rod 32. The arm 30 supports a replaceable blade member 33 operating in combination with a fixed blade member 34 supported by the framework holding the pivot shaft 31. The cutting operation is synchronized to occur within the short period between the end of the percussion headstock stroke and the initiation of its return stroke.

The length of the cut-off portion of the rod is adjusted by sliding the blade assembly along the pivot shaft 31, thus varying the length of the workpiece projecting from the die-clamp.

Numerous modifications and variations of the disclosed embodiments of the invention will now become evident to those skilled in the art, without departing from the scope and spirit of the invention.

What is claimed is:

1. An improvement in apparatus for a cold-stamping of a product in which a rotary member provided with die clamps is rotated to successive operation stations adjacent a reciprocal percussion head so that a workpiece held by the die clamps can be successively acted on by the percussion head to form the desired product, said improvement comprising means for axially feeding an elongated rod, from which workpieces are to be cut, through the percussion head to the die clamps as the latter successively occupy a position in alignment with the rod, and cutting means disposed between the percussion head and rotary member for severing a portion of the rod held in successive die clamps to leave a workpiece in each die clamp, said cutting means comprising a displaceable blade member having a circular opening aligned with the rod and through which the rod passes for entry into the die clamps, and a fixed blade member adjacent the displaceable blade member, said fixed blade having a circular opening for cooperating with said circular opening in said displaceable blade for positively constraining said rod laterally when severing said rod.

2. An improvement as claimed in claim 1 comprising means supporting the cutting means for relative movement with respect to the rotary member in a direction axially of the rod to enable adjustment of the length of the workpieces severed from the rod.

3. An improvement as claimed in claim 1 wherein said means for axially feeding the rod comprises a pair of spaced rollers adjacent the head, said rollers engaging the rod therebetween.

4. An improvement as claimed in claim 1 wherein said head carries a plurality of dies for acting in succession on the workpieces to form the desired product, and the rotary member includes means for removing the product from the die clamps to enable subsequent workpieces to be engaged therein.

5. An improvement as claimed in claim 1 wherein said displaceable blade member is pivotal and comprises a rotatable arm and a replaceable cutting head detachably secured to said arm.

6. An improvement as claimed in claim 5 comprising a shaft extending parallel to the axial path of travel of the rod supporting said arm for adjustment of the axial position thereof on said shaft, the fixed blade being adjusted together with the arm on said shaft.

7. An improvement as claimed in claim 6 comprising an actuator bar secured to the arm eccentrically of the shaft for rotating the arm and the cutting head therewith in synchronism with the head such that after the rod has been engaged in a die-clamp and before the head has completed its return stroke away from the rotary body the rod is severed to leave a workpiece in the die-clamp.

8. An improvement as claimed in claim 1 wherein said displaceable blade member is supported for linear movement transversely of the rod to sever a workpiece therefrom.

9. An improvement as claimed in claim 8 comprising a guide bush carried by said displaceable blade member and having said circular opening through which the rod passes.

10. An improvement as claimed in claim 9 comprising spring means acting on the displaceable blade member to urge the same to an inoperative cutting position and cam means acting on the displaceable blade member for displacing the same to operative position in opposition to the spring means in synchronism with the movement of the head such that after the rod has been engaged in a die-clamp and before the head has completed its return stroke away from the rotary body the rod is severed to leave a workpiece in the die-clamp.

References Cited

UNITED STATES PATENTS

| | | | |
|---|---|---|---|
| 15,928 | 10/1856 | McPhetridge | 10—13 |
| 311,969 | 2/1885 | Fischer et al. | 10—13 |
| 441,229 | 11/1890 | Danks | 10—13 |
| 651,007 | 6/1900 | Danks | 10—13 |
| 2,395,722 | 2/1946 | Buchet | 10—13 |
| 1,637,107 | 7/1927 | Dwyer et al. | 10—13 |

FOREIGN PATENTS

| | | | |
|---|---|---|---|
| 1,268 | 1/1904 | Great Britain | 10—13 |
| 39,081 | 3/1886 | Germany | 10—13 |
| 56,291 | 11/1912 | Austria | 10—13 |

CHARLES W. LANHAM, Primary Examiner

E. M. COMBS, Assistant Examiner